Aug. 20, 1957     C. V. BULLEN ET AL     2,803,813
DEVICE FOR SENSING THE FORMATION OF SOLIDS IN A FLUID MEDIA
Filed Sept. 28, 1955     2 Sheets-Sheet 1
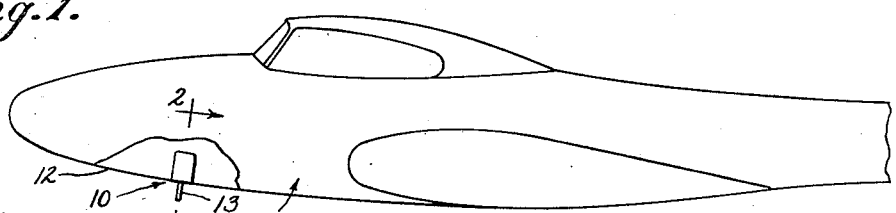
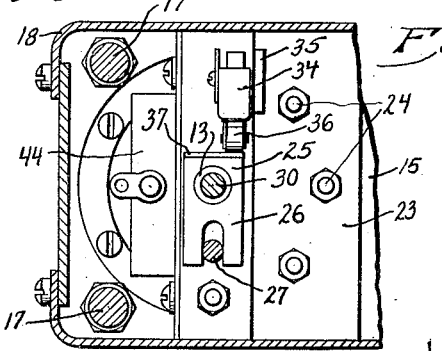
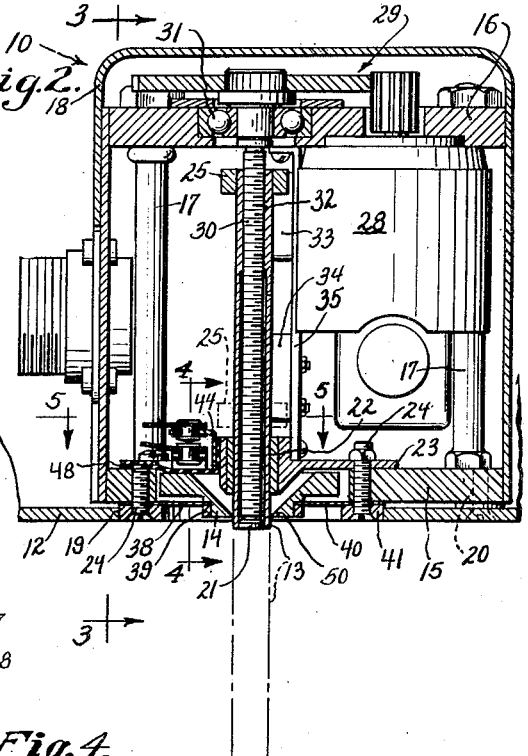
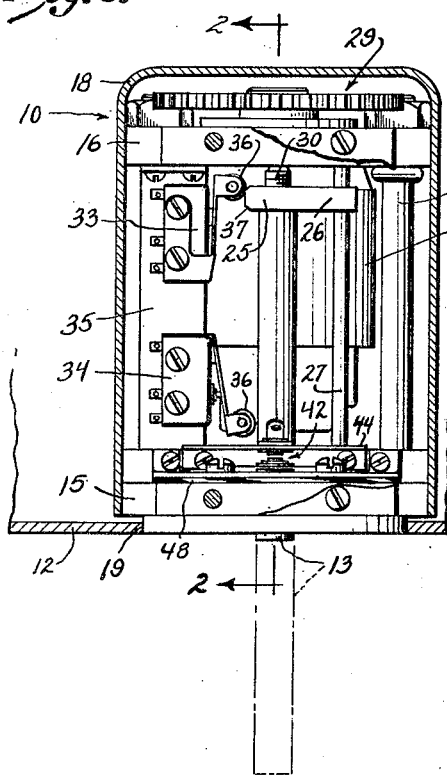
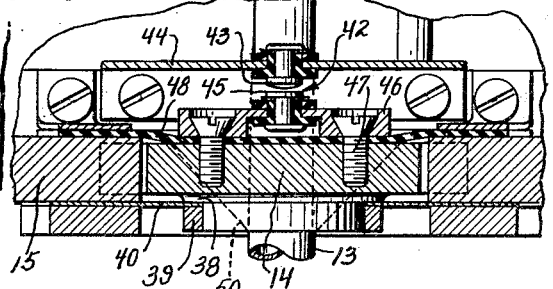
INVENTOR.
Clark V. Bullen and
William F. Tice
BY Carlson, Pitzner, Hubbard & Wolfe
ATTORNEYS

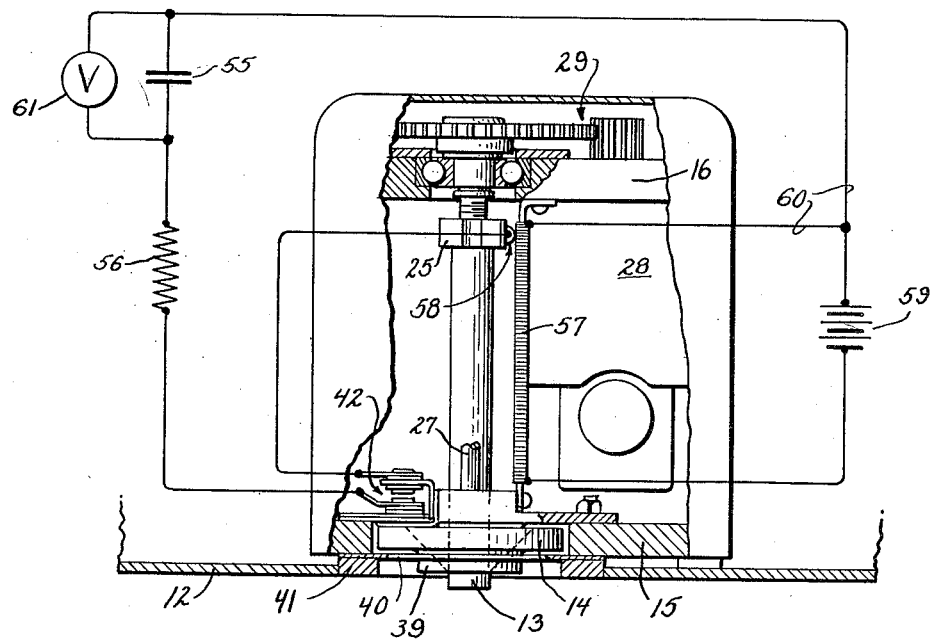

United States Patent Office 2,803,813
Patented Aug. 20, 1957

2,803,813

DEVICE FOR SENSING THE FORMATION OF SOLIDS IN A FLUID MEDIA

Clark V. Bullen and William F. Tice, Rockford, Ill., assignors to Barber-Colman Company, Rockford, Ill., a corporation of Illinois Application September 28, 1955, Serial No. 537,232

11 Claims. (Cl. 340—234)

This invention relates to a device for detecting the presence of conditions in a liquid or gaseous media that may cause the formation of a solid therein and more particularly conditions that may cause the solid to form and accumulate on a surface exposed in the fluid.

A general object is to provide a sensing device of the above character which is simple in construction and yet more accurate and reliable in service operation than the devices heretofore devised.

Another object is to sense the conditions conducive to formation of a solid in a fluid through the use of a member alternately projected into and withdrawn from the fluid to be tested.

A more detailed object is to detect the accumulation of the solid on the testing member by a feeler engageable with the solid during the retraction of the member.

A further object is to utilize the sensing feeler to remove or scrape the solid off from the member and thus condition the same for the next sensing cycle.

Still another object is to detect the rate of formation as well as the presence of the solid in the fluid being tested.

The invention also resides in the novel construction and mounting of the feeler and in the manner of actuating the same.

Other objects and advantages of the invention will become apparent from the following detailed description taken in connection with the accompanying drawings, in which—

Figure 1 is a fragmentary view of an airplane equipped with an ice sensing device embodying the novel features of the present invention.

Fig. 2 is a fragmentary sectional view taken along the line 2—2 of Figs. 1 and 3.

Figs. 3, 4, and 5 are sectional views taken respectively along the lines 3—3, 4—4, and 5—5 of Fig. 2.

Fig. 6 is a schematic view and wiring diagram showing an alternate use of the improved sensing device.

While the invention is susceptible of various uses particularly in the chemical industries for detecting the formation of solids on surfaces exposed to liquid or gaseous media, it has been shown in the drawings and will be described herein as a device for sensing the presence of conditions conducive to the formation of ice on the external surfaces of an airplane. It is to be understood, however, that the invention is not limited to such use nor to the particular construction selected for purposes of illustration, but aims to include all modifications, alternative constructions, and uses falling within the spirit and scope of the invention as expressed in the appended claims.

In the embodiment shown, the improved sensing device indicated generally at 10 is mounted on some part of the fuselage 11, such as the skin or surface 12 of the aircraft, for convenient access to the air passing over the external surface of the craft.

Generally stated, the device 10 comprises a finger-like part or testing member 13 which is alternately projected outwardly into the fluid to be tested and then retracted. The solids, ice in this instance, forming or depositing on the finger engages a yieldable abutment 14 during the retraction and movement of the abutment signals the existence of the objectionable conditions.

The finger 13 and all of the operating parts of the device are mounted on a frame comprising spaced plates 15 and 16 rigidly joined by spaced bars 17 and enclosed in a casing 18 secured to the inner side of the aircraft skin 12 opposite a hole 19 therein through which the finger is projected. Herein, the attachment is by screws 20 extending through the skin into the frame plate 15.

In the present instance, the finger 13 takes the form of an elongated preferably cylindrical tube closed at its outer end 21 and slidable in a guide 22 supported by a bracket 23 herein clamped by screws 24 to the inner side of the frame plate. A hub 25 secured to the other end of the tube is on the end of an arm 26 whose outer end receives and slides along a rod 27 by which the tube is held against turning during its endwise movement between the retracted position shown in full in Fig. 2 and an advanced position shown in phantom.

Outward projection and retraction of the finger in cycles long enough to allow ice to form on the external surface of the finger may be effected in various ways. Herein this is achieved through the use of a reversible electric motor 28 operating through reduction gearing 29 and a screw mechanism so as to derive a substantial force for actuating the finger 13. The motor is mounted on and between the frame plates and the gears are carried by the plate 16, the terminal gear being fast on a shaft 30 journaled in a bearing 31 and axially alined with the tube. The other end of the shaft is threaded and mates with a nut 32 formed by internally threading the inner end of the tube 13. A powerful actuating force is thus derived from operation of the motor and applied to the tube in a true axial direction.

Operation of the motor alternately in opposite directions may be controlled by limit switches 33 and 34 mounted on a bracket 35 of the frame and having follower rollers 36 positioned to be actuated by a cam 37 on the tube 13. This cam may be formed on the hub 25 of the arm 26.

Herein, the abutment 14 comprises a ring closely surrounding the exterior of the finger 13 substantially in the plane of the skin 12. To support the ring for yielding longitudinally of the finger, an external shoulder 38 on the ring is clamped by a pressed on collar 39 to the inner periphery of a flat resilient diaphragm 40. The outer edge of the latter is clamped by the screws 24 and a ring 41 against the outer frame plate 15. Thus the abutment 14 is normally disposed substantially flush with the aircraft skin 12 but is, by flexing of the diaphragm, movable inwardly a short distance determined by engagement of the ring 14 and the finger supporting bracket 23.

This inward movement of the ring 14 closes a normally open switch 42 thus signaling the existence of the ice formation. As shown, the switch includes a stationary contact 43 mounted on a channel shaped bracket 44 secured to the frame plate 15 through the bracket 23. This contact cooperates with a contact 45 on a block 46 secured by screws 47 to the inner end of the abutment ring 14. To exclude moisture from the switch chamber, a flexible diaphragm 48 is interposed between the bracket 23 and the frame 15 and between the block 46 and the ring 14.

The invention contemplates using the abutment 14 to perform the additional function of cleaning the solid off from the finger 13 during the retracting part of each cycle by power derived from the motor actuator. This is accomplished simply by disposing the inner edge 50 of the abutment close to and substantially in rubbing contact with the exterior of the finger surface so that this edge in effect functions as a scraper to break the solid or ice off from the finger surface. The motor actuator operating through the screw provides ample force for producing this supplemental action by the sensing abutment.

The automatic sensing device is rendered operative simply by energizing the motor 28. Thereafter, the finger 13 is slowly moved endwise and outwardly to the position shown in phantom (Fig. 2) in an interval which, for sensing ice forming conditions around an aircraft, is of several seconds duration. At the outer limit of the travel, the motor is reversed, and the finger will be retracted inwardly at the same slow rate until the finger reaches the position shown in full. Similar advance and retraction cycles are executed successively and continuously.

If the condition of the air is not conducive to the formation of ice on the aircraft surface, the surface of the finger 13 will remain bare during the reciprocation of the finger. The latter will thus slide back and forth through the abutment ring without overcoming the spring 40, the switch 42 remaining open. Now, if a film of ice forms on the surface while the latter is being projected outwardly, the diameter of the finger will be increased so that it will no longer slide freely through the abutment edge when the finger is again retracted inwardly. Therefore, as the next retraction of the finger starts, the abutment will yield and be drawn inwardly with the finger thus closing the switch 42 which signals the existence of the ice forming conditions.

Retraction of the finger by the screw actuator continues after the abutment has come against a stop formed by the bracket 23. This is permitted by the breaking or scraping of the ice off from the finger 13 by the action of the sharpened edge 50. In this way, the finger is cleaned automatically and thus prepared for the next sensing cycle which is initiated by the subsequent outward movement of the finger.

The sensing device above described is well suited for use in detecting the rate of formation of the solid in the fluid being tested. Such a modification is shown in Fig. 6 in which the feeler 13 is projected alternately into and out of the fluid under test and is surrounded by the scraper 14 which will respond, as by closure of the switch 42, to a predetermined accumulated thickness of actual solid material on the external surface of the feeler. Associated with the latter is a mechanism for determining the time of closure of the switch after the feeler starts its retracting stroke, the length of the interval between the start of the retraction and the sensing of a predetermined solid accumulation being an accurate measure of the rate at which the deposit is being formed on the feeler.

In the form shown for purposes of illustration, a capacitor 55 is charged in response to the detection of a solid on the feeler 13 and the magnitude of such charge is varied automatically in accordance with the timing of such detection in relation to the start of the retracting stroke of the feeler 13. To this end, the condenser is interposed in a circuit which includes a resistance 56, the switch 42, and a voltage source which is varied in magnitude with changes in the position of the feeler. This source may take the form of a potentiometer having a resistance winding 57 extending along the path of the feeler and engaged by a slider 58 which is carried by the feeler. Opposite ends of the resistance 57 are connected to a voltage source such as a battery 59 and the slider is connected to one terminal of the switch 42. The inner end of the resistance 57 is joined by a conductor 60 to the other terminal of the condenser 55. The voltage across the condenser is indicated by a voltmeter 61.

With the circuit arranged as above described, it will be apparent that the capacitor 55 will be charged to an average value of the voltage drop across the portions 58, 60 of the potentiometer while the switch 42 is closed. In this way, the voltage indicated on the meter 61 corresponds to the rate at which the ice or other solid is forming on the surface of the feeler 13.

It will be apparent that the device as above described, although of very simple construction, is extremely accurate and reliable in operation and not subject to clogging as by an accumulation of the solid on its parts. The sensing element is cleaned in each cycle by the powerful action of the same operator that effects the sensing action. The formation of the finger as a tube telescoping over the screw results in extremely overall compactness while at the same time deriving the force necessary to achieve the desired scraping action.

We claim as our invention:

1. A device for sensing the presence of solid forming conditions in a fluid comprising a support having an opening therein, a member extending through said opening and mounted for movement outwardly and backwardly therethrough to expose increasing and decreasing areas of the member surface exteriorly of said support, an abutment mounted on said support for yielding movement along the path of movement of said member and engageable during retraction of the member with the solid formed on said exposed surface, and means on said support for sensing yielding of said abutment away from a predetermined position.

2. The device as defined in claim 1, in which a face of said abutment is disposed close to and in substantial contact with said member to form a scraper for removing said solid from the member during retraction thereof.

3. A device for sensing the presence of solid forming conditions in a fluid medium comprising a housing having a hole opening toward said medium, a rigid member guided for endwise movement into and out of said medium through said hole, a yieldably mounted abutment adjacent said member in scraping relation therewith, and means for sensing yielding of said abutment when the latter engages a solid formed on the surface of said member.

4. A device for sensing the presence of solid forming conditions in a fluid medium comprising a tubular finger mounted for axial movement into and out of said medium, a screw telescoping with and threaded into said finger, means for rotating said screw in one direction to project said finger into said medium and then in the other direction to retract said finger, a yieldably mounted abutment having a scraping surface disposed closely adjacent said finger, and means for sensing yielding of said abutment upon its engagement with a solid formed on said finger.

5. In a device for sensing the presence of solid forming conditions in a fluid medium, the combination of a member movable into and out of said medium along a predetermined path, an abutment engageable with a solid formed on the surface of said member and mounted to yield in a direction longitudinally of said path, means for alternately moving said member outwardly and retracting the same along said path, and means for sensing yielding of said abutment during a retracting movement of said member.

6. The combination of, a member mounted for movement into and out of a fluid to be tested, means for moving said member periodically into and out of said fluid, a yieldable abutment disposed adjacent the surface of said member so as to be engaged and moved by a solid deposited from said fluid and accumulating on said surface, a circuit closed in response to yielding of said abutment and including a capacitor, means for indicating the charge thereon, and a voltage source connected to said capacitor upon closing of said circuit and varied progressively during the retracting movement of said member to vary the charge on said capacitor.

7. The combination of, a member mounted for movement into and out of a fluid to be tested, means for moving said member periodically into and out of said fluid, a yieldable abutment disposed adjacent the surface of said member so as to be engaged and moved by a solid deposited from said fluid and accumulating on said surface, a circuit closed in response to yielding of said abutment, means providing a voltage source varied progressively during retraction of said member, and means for detecting the value of said voltage at the time of closure of said circuit.

8. The combination of, a member mounted for movement into and out of a fluid to be tested, means for moving said member periodically into and out of said fluid, a yieldable abutment disposed adjacent the surface of said member so as to be engaged and moved by a solid deposited from said fluid and accumulating on said surface, means for detecting the time, during the retraction of said member, at which said abutment is actuated, and mechanism for producing a signal of a magnitude corresponding to the extent of said retraction at the time of yielding of said abutment.

9. The combination of, a member mounted for movement into and out of a fluid to be tested, means for moving said member periodically into and out of said fluid, a yieldable abutment disposed adjacent the surface of said member so as to be engaged and moved by a solid deposited from said fluid and accumulating on said surface, and means responsive to the retracting motion of said member and the yielding of said abutment and operable to produce a signal corresponding to the rate at which said solid is being deposited on said member surface.

10. Apparatus for detecting the presence of solid forming conditions in a fluid, said apparatus comprising a supporting frame, a member mounted on said frame for movement outwardly and inwardly relative thereto, means yieldably mounted on said frame for movement in one direction on engagement with a solid on said member during inward movement thereof, and switch means mounted on said frame and operatively associated with said yieldable means for closing movement in response to yielding movement thereof in said one direction.

11. In a device for sensing the presence of a material having resistance to flow, the combination that comprises a support, collecting means mounted for movement along a definite path relative to said support and into an area where said material may be deposited thereon, yieldable means carried by said support and disposed adjacent the path of said collecting means so as to be engaged and moved by a material deposited on said collecting means, and means positioned to be operably connected with said yieldable means upon movement of said yieldable means when the latter engages a material deposited on said collecting means.

References Cited in the file of this patent
UNITED STATES PATENTS

| | | |
|---|---|---|
| 2,414,756 | May | Jan. 21, 1947 |
| 2,445,200 | Wolfe | July 13, 1948 |
| 2,483,333 | Cannon et al. | Sept. 27, 1949 |
| 2,682,771 | Parker | July 6, 1954 |